(12) United States Patent
Womack et al.

(10) Patent No.: US 7,594,787 B2
(45) Date of Patent: Sep. 29, 2009

(54) TRACK SLOT FASTENER

(75) Inventors: Darren Womack, Windsor (CA); William G. Bowes, Macomb Township, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/149,093

(22) Filed: Apr. 25, 2008

(65) Prior Publication Data
US 2008/0279649 A1 Nov. 13, 2008

Related U.S. Application Data

(60) Continuation of application No. 11/476,911, filed on Jun. 29, 2006, now abandoned, which is a continuation of application No. 10/994,334, filed on Nov. 23, 2004, now Pat. No. 7,070,374, which is a division of application No. 10/336,033, filed on Jan. 3, 2003, now Pat. No. 6,827,531.

(51) Int. Cl.
*B60P 7/08* (2006.01)
(52) U.S. Cl. .................................... 410/104; 410/106
(58) Field of Classification Search ............... 410/104, 410/105, 106, 110; 24/115 K, 265 CD; 248/499; 114/218
See application file for complete search history.

(56) References Cited

U.S. PATENT DOCUMENTS

| 2,110,435 A | 3/1938 | Albin |
| 2,602,691 A | 7/1952 | Doty |
| 2,685,848 A | 8/1954 | Meighan et al. |
| 2,688,289 A | 9/1954 | Sterling |
| 2,696,139 A | 12/1954 | Attwood |
| 2,736,272 A | 2/1956 | Elsner |
| 3,005,292 A | 10/1961 | Reiland |
| 3,053,355 A | 9/1962 | Attwood |
| 3,169,792 A | 2/1965 | Solano |
| 3,241,501 A | 3/1966 | Welton |
| 3,478,995 A | 11/1969 | Lautzenhiser et al. |

(Continued)

FOREIGN PATENT DOCUMENTS

EP 0 62 8 738 12/1994

(Continued)

OTHER PUBLICATIONS

Article—Detroit Auto Show 2001-Toyota Matrix;http://203.139.122.131/motorshow/international/matrix_4.html; Mar. 14, 2001, 2 page.

(Continued)

*Primary Examiner*—Stephen Gordon
(74) *Attorney, Agent, or Firm*—Foley & Lardner LLP

(57) ABSTRACT

A slidably retainable fastener assembly for securing loads to a track is provided with a retainer adapted to fit at least partly within a track slot and a member operating on the retainer, the member being positionable in at least a first position and a second position. When the member is positioned in the first position, the member causes the retainer to disengage the track slot thereby allowing the fastener to be movable within the track slot, and when the member is positioned in the second position, the member causes the retainer to engage the track slot thereby causing the fastener to remain stationary within the track slot.

9 Claims, 14 Drawing Sheets

U.S. PATENT DOCUMENTS

| | | |
|---|---|---|
| 3,643,973 A | 2/1972 | Bott |
| 3,658,012 A | 4/1972 | Caringi |
| 3,722,910 A | 3/1973 | Heckenlaib |
| 3,802,138 A | 4/1974 | McCart |
| 3,831,976 A | 8/1974 | Iden |
| 3,877,671 A | 4/1975 | Underwood et al. |
| 3,951,444 A | 4/1976 | Shull |
| 3,972,500 A | 8/1976 | Johnson et al. |
| 4,109,891 A | 8/1978 | Grendahl |
| 4,168,668 A | 9/1979 | Grube et al. |
| 4,226,465 A | 10/1980 | McCullough |
| 4,239,139 A | 12/1980 | Bott |
| 4,248,558 A | 2/1981 | Lechner |
| 4,270,681 A | 6/1981 | Ingram |
| 4,278,376 A | 7/1981 | Hunter |
| 4,285,379 A | 8/1981 | Kowalski |
| 4,396,324 A | 8/1983 | Ellis |
| 4,410,298 A | 10/1983 | Kowalski |
| 4,449,875 A | 5/1984 | Brunelle |
| 4,469,261 A | 9/1984 | Stapleton et al. |
| 4,500,020 A | 2/1985 | Rasor |
| 4,545,697 A | 10/1985 | Verdenne et al. |
| 4,575,295 A | 3/1986 | Rebentisch |
| 4,630,982 A | 12/1986 | Fenner |
| 4,666,355 A | 5/1987 | Stover |
| 4,708,549 A | 11/1987 | Jensen |
| 4,717,298 A | 1/1988 | Bott |
| 4,739,528 A | 4/1988 | Allen |
| 4,741,582 A | 5/1988 | Peroni |
| 4,778,092 A | 10/1988 | Grace |
| 4,784,552 A | 11/1988 | Rebentisch |
| 4,827,742 A | 5/1989 | McDonald |
| 4,840,525 A | 6/1989 | Rebentisch |
| 4,850,063 A | 7/1989 | Abbate |
| 4,850,769 A | 7/1989 | Matthews |
| 4,887,947 A | 12/1989 | Bott |
| 4,911,348 A | 3/1990 | Rasor et al. |
| 4,915,342 A | 4/1990 | Nilsson |
| 4,941,702 A | 7/1990 | Southward |
| D310,017 S | 8/1990 | Matthews |
| 4,948,313 A | 8/1990 | Zankovich |
| 4,950,099 A | 8/1990 | Roellin |
| 4,955,771 A | 9/1990 | Bott |
| 4,961,553 A | 10/1990 | Todd |
| 4,969,784 A | 11/1990 | Yanke |
| 4,984,726 A | 1/1991 | Marshall |
| 5,044,856 A | 9/1991 | Jerabek |
| 5,137,403 A | 8/1992 | McCaffrey |
| 5,143,415 A | 9/1992 | Boudah |
| 5,154,385 A | 10/1992 | Lindberg et al. |
| 5,165,628 A | 11/1992 | Todd et al. |
| 5,188,479 A | 2/1993 | Nehls |
| 5,199,836 A | 4/1993 | Gogarty |
| 5,209,619 A | 5/1993 | Rinderer |
| 5,228,736 A | 7/1993 | Dutton |
| 5,259,711 A | 11/1993 | Beck |
| 5,265,992 A * | 11/1993 | Jensen ............ 410/116 |
| 5,271,586 A | 12/1993 | Schmidt |
| 5,297,888 A | 3/1994 | Nehls |
| 5,316,357 A | 5/1994 | Schroeder |
| 5,366,327 A | 11/1994 | Nelson |
| 5,370,488 A | 12/1994 | Sykes |
| 5,409,335 A | 4/1995 | Beck |
| 5,411,356 A | 5/1995 | Travis et al. |
| 5,433,550 A | 7/1995 | Huber |
| 5,433,566 A | 7/1995 | Bradley |
| 5,494,388 A | 2/1996 | Stevens |
| 5,533,848 A | 7/1996 | Davis |
| 5,560,666 A | 10/1996 | Vieira et al. |
| 5,628,598 A | 5/1997 | Hoefle |
| 5,655,865 A | 8/1997 | Plank et al. |
| 5,674,033 A | 10/1997 | Ruegg |
| 5,676,508 A | 10/1997 | Weicht |
| 5,690,460 A | 11/1997 | Attanasio |
| 5,704,571 A | 1/1998 | Vargo |
| 5,765,978 A | 6/1998 | Looker et al. |
| 5,775,652 A | 7/1998 | Crawshaw et al. |
| 5,779,412 A | 7/1998 | Nagai et al. |
| 5,794,901 A | 8/1998 | Sigel |
| 5,820,322 A | 10/1998 | Hermann et al. |
| 5,823,724 A | 10/1998 | Lee |
| 5,823,727 A | 10/1998 | Lee |
| 5,827,023 A | 10/1998 | Stull |
| 5,893,538 A | 4/1999 | Onishi et al. |
| 5,915,900 A | 6/1999 | Boltz |
| 5,947,356 A | 9/1999 | Delong |
| 5,961,263 A | 10/1999 | Nunez |
| 5,975,822 A | 11/1999 | Ruff |
| 6,010,287 A | 1/2000 | Sommermeyer et al. |
| 6,017,071 A | 1/2000 | Morghen |
| 6,022,164 A | 2/2000 | Tsui et al. |
| 6,050,763 A | 4/2000 | Swailes |
| RE36,681 E | 5/2000 | Rinderer |
| 6,059,498 A | 5/2000 | Ostrowski |
| 6,086,300 A | 7/2000 | Froehlich |
| 6,113,328 A | 9/2000 | Claucherty |
| 6,196,777 B1 | 3/2001 | Price |
| 6,213,539 B1 | 4/2001 | Williams et al. |
| 6,238,153 B1 | 5/2001 | Karrer |
| 6,250,861 B1 | 6/2001 | Whitehead |
| 6,260,813 B1 | 7/2001 | Whitcomb |
| D446,442 S | 8/2001 | Simpson |
| 6,270,301 B1 | 8/2001 | Dunlop |
| 6,290,426 B1 | 9/2001 | Van Gijsel et al. |
| 6,334,750 B1 | 1/2002 | Hsieh |
| 6,336,766 B1 | 1/2002 | De |
| 6,336,779 B1 | 1/2002 | Jakob et al. |
| 6,338,599 B1 | 1/2002 | Uno |
| 6,338,649 B1 | 1/2002 | Smith |
| 6,846,140 B2 | 1/2002 | Anderson et al. |
| 6,439,814 B1 | 8/2002 | Floe |
| 6,585,465 B1 | 7/2003 | Hammond et al. |
| 6,592,310 B2 | 7/2003 | Hyp et al. |
| 6,644,901 B2 | 11/2003 | Breckel |
| 6,712,568 B2 | 3/2004 | Snyder et al. |
| 6,827,531 B2 | 12/2004 | Womack et al. |
| 6,884,011 B1 | 4/2005 | Saward |
| 6,910,609 B2 | 6/2005 | Williams et al. |
| 2002/0048495 A1 | 4/2002 | Anderson et al. |
| 2002/0164225 A1 | 11/2002 | Snyder et al. |
| 2005/0036848 A1 | 2/2005 | Cunningham et al. |
| 2005/0145662 A1 | 7/2005 | Williams et al. |

FOREIGN PATENT DOCUMENTS

WO    WO/2004/094194 A1    11/2004

OTHER PUBLICATIONS

Article—Ford Motor Company, "Mercury accessories", pp. 1-23.
Article—Hi-Lift.com web site; Oct. 16, 2001 (8 pgs.).
Article—MaxRax "The Solution to Your Hauling Problem", http:www.truckracks.com/; Jul. 27, 2000, 1 page.
Article—Midland-Ross Corporation, "Goldguard -New standard in corrosion protection from Superstrut", Superstrut Division, Oakland, CA, 1 page.
Article—Mirage Truck Rack; "The Original Disappearing Rack"; U.S. Patent 5,143,415; Mirage truck rack accessories; http:www.altech.ab.ca/jembrack/mirage3.htm; Nov. 14, 2000, 2 pages.
Article—Saddlepack Storage Systems for Long Bed Trucks by Steel Horse, TruckStuff USA, http://www.truckstuffusa.com/ste58202.html; Jul. 27, 2000, 1 page.
Article—Superstrut, "Metal Framing Channel & Pipe Hangers-Typical Applications", pp. 1-4 (1984).

Article—Superstrut, "Superstruts Products From BCR, Inc., Building Specialties", pp. 1-4.

Article—Superstrut, "Total Support Systems", Superstrut Division-Illustrated Price List, pp. 1-41 (1986).

Article—SystemOne Modular Truck Equipment, Christensen Manufacturing, http:www.christensenmfg/com/html/features.html; Jul. 27, 2000, 2 pages.

Article—Toyota's 2001 Toyota Matrix—"Connect. toyota.com/matrix," Toyota Motor Sales, U.S.A., 4 pages.

Article—Toyota's 2001 Toyota Matrix—Truckworld Online!; http://www.truckworld.com/Sport-Utility/01-toyota-matrix/01-toyotamatrix.html; Mar. 7, 2001, 4 pages.

Article—TracRac, "Packing Check List", TracRac , Fall River, MA, 2 pages (1998).

Article—TracRac, "The Ultimate Sliding Truck Rack System", TracRac , Fall River, MA, 1 page.

Article—TracRac, "The Ultimate Van Rack", TracRac , Fall River, MA, 1 page.

Article -BCR, Inc, Building Specialties, Aickinstrut Structures and Fasteners, Aickinstrut, Inc., pp. A-D.

Article -B-Line Systems Inc., "Strut Systems", Engineering Catalog, pp. 1-176.

Article -CargoGear, Internet Catalog Sale Receipt, Saris Corporation, Tucson , AZ, 1 page (2000).

Article -Midland-Ross Corporation, "Superstrut-The Complete Line. One Source.", Superstrut Division, Oakland, CA, 1 page.

Article -SystemOne Modular Truck Equipment, Christensen Manufacturing, http:www.christensenmfg.com/; Jul. 27, 2000, 1 page.

Article -Unistrut Los Angeles, "Unistrut framing systems, for Maintenance Supervisors, Design Engineers, Plant Engineers", pp. 1-31.

Article -Unistrut, General Engineering Catalog, pp. 1-126.

Brochure—Hi-Lift® The Original Jacks, Bloomfield Manufacturing Co., Inc., 2001, cover page, pp. 6 and 7.

Dialog File 226; U.S. Trademark registrations 1,824,078; 1,613,372 and 828,807, "Slide-N-Lock".

Ringbolts, Tie Down Rings & Pad Eyes; printed Aug. 1, 2005; http://www.mcmaster.com.

* cited by examiner

TRACK SLOT FASTENER

CORRESPONDING RELATED APPLICATIONS

The present application is a continuation of U.S. application Ser. No. 11/476,911 filed Jun. 29, 2006 and now abandoned, which is a continuation of U.S. application Ser. No. 10/994,334 filed Nov. 23, 2004 and now U.S. Pat. No. 7,070,374, which is a divisional of U.S. application Ser. No. 10/336,033, filed Jan. 3, 2003 now U.S. Pat. No. 6,827,531. The present application is related to U.S. application No. 09/874,979 filed on Jun. 7, 2001, and U.S. Pat. No. 6,712,568 issued Mar. 30, 2004, to Mark D. Snyder et al., all of which are incorporated by reference herein in their entirety.

BACKGROUND OF THE INVENTION

1. Field of the Invention

The present invention relates generally to fasteners for securing loads to a track, and more particularly, to adjustable fasteners for securing loads to a track mounted in or near a truck bed.

2. Background of the Invention

Fasteners for securing loads to framing, tracks, and channels have been commercially available for some time. Some conventional fasteners used in automotive track applications will be briefly described below.

Conventional track fasteners have been designed to be removable and/or relocateable along a track slot length. Many of these conventional track fasteners employ a rotatable locking base portion that engages locking teeth inside the track slot or on a locking mechanism to securely retain the fastener within the track slot, and to facilitate relocation along the track slot length. These devices, however, can be difficult to install and use, which detracts from their desirability in consumer environments such as original equipment manufactured (OEM) vehicles (e.g., pickup trucks, mini-vans, sport-utility vehicles (SUV) etc.). Often, conventional track fasteners can only be loaded from an end of the track slot (i.e., their design does not facilitate top down loading), and are thus difficult to replace if broken. Also problematic, many of these fasteners have limited load capacities, such as fasteners available on roof racks, and are thus unsuitable for applications such as truck beds and cargo shipping where heavier loads are placed.

Other conventional track fasteners (e.g., U.S. Pat. Nos. 4,410,298, 4,784,552, and Re. 36,681, which are incorporated by reference herein in their entirety) have been designed with a center through bolt to apply pressure between a top plate mounted above the track slot and a base plate mounted within the track slot. The bolt can be tightened to "clamp" the fastener in place, thereby securely retaining the fastener within the track slot, or loosened to facilitate relocation along the track slot length. Clamp styled fasteners are often used to temporarily attach rails to the top side of a truck bed for tonneau covers and the like, and are generally relocatable along the length of the track slot. These devices, however, often require a user to have a wrench to loosen/tighten the bolt, which detracts from their ease of use.

Some conventional track fasteners have a track slot with predetermined fastening locations. See, for example, U.S. Pat. No. 4,850,769, which is incorporated by reference herein in its entirety. In one such device, predetermined fastening locations are set at enlarged openings in a top surface of the track in which a movable car "drops into" to retain the movable car in that particular position. The car may include a spring biased vertically movable latch to releasably engage the openings. These devices, however, are limited to the specific predetermined fastening locations, which reduces their utility for many applications. Moreover, as with other conventional track fasteners, these devices typically require the car to be loaded into the track slot from one end of the track slot, making it substantially more difficult to repair or replace a given fastener.

Thus, a need exists for an improved track slot fastening device.

SUMMARY OF THE INVENTION

The present invention is directed to overcoming or at least reducing the effects of one or more of the problems set forth above and other problems in the prior art.

According to one embodiment of the present invention, a fastener assembly for securing loads to a track is provided, the fastener assembly being slidably retainable within a track slot of the track. The fastener assembly comprises a retainer adapted to fit at least partly within the track slot, a cam member operating on the retainer, the cam member being positionable in at least a first position and a second position, and a pressure plate positioned above the track and below the cam member, the pressure plate applying a pressure on a top surface of the track in response to the position of the cam member. When the cam member is positioned in the first position, the cam member causes the retainer to disengage the track slot thereby allowing the fastener to be movable within the track slot, and when the cam member is positioned in the second position, the cam member causes the retainer to engage the track slot thereby causing the fastener to remain stationary within the track slot.

According to another embodiment of the present invention, a slidable fastening device for securing an object to a track is provided, the fastening device being slidable along a track slot of the track. The slidable fastening device comprises a base portion positionable at least partly within the track slot, the base portion being horizontally displaceable along the track slot and vertically displaceable in a direction substantially perpendicular to a top surface of the track slot, a pressure plate positioned above the base portion for applying a pressure to the top surface of the track slot, and a pivotable actuator for selectably applying a force on the pressure plate thereby vertically displacing the base portion between an engagement position and a released position, the engagement position fixing the position of the fastening device within the track slot, and the released position allowing slidable displacement along the track slot.

According to another embodiment of the present invention, a method of securing an object to a track including a track slot is provided, comprising pivoting a cam member to a retain position, vertically displacing a retainer positioned within the track slot in response to motion of the cam member, applying a substantially uniform force across a top surface of the track slot opposite to the retainer, and engaging the retainer with an inner surface of the track slot.

According to another embodiment of the present invention, a fastener assembly for securing loads to a track is provided, the fastener assembly being slidably retainable within a track slot of the track. The fastener assembly comprises a retainer including a base portion adapted to fit at least partly within the track slot, and a ratchet lock for locking the retainer to the track slot.

According to another embodiment of the present invention, a method of securing an object to a track including a track slot is provided, comprising rotating a ratchet lock, vertically displacing a member positioned within the track slot in response to rotating the ratchet lock, and locking a retainer to the track slot via the vertically displaced member.

According to another embodiment of the present invention, a fastener assembly for securing loads to a track is provided, the fastener assembly being slidably retainable within a track slot of the track. The fastener assembly comprises a retainer adapted to fit at least partly within the track slot, and a pin lock operating on the retainer, the pin lock being positionable in at least a first position and a second position. When the pin lock is positioned in the first position, the pin lock causes the retainer to disengage the track slot thereby allowing the fastener assembly to be movable within the track slot, and when the pin lock is positioned in the second position, the pin lock causes the retainer to engage the track slot thereby causing the fastener assembly to remain stationary within the track slot.

According to another embodiment of the present invention, a fastener assembly for securing loads to a track is provided, the fastener assembly being slidably retainable within a track slot of the track. The fastener assembly comprises means for locking a retainer to the track slot in a locked position, means for selectably releasing the retainer from the locked position, and means for securing the load to the retainer.

According to another embodiment of the present invention, a fastener assembly for securing loads to a track is provided, the fastener assembly being slidably retainable within a track slot of the track. The fastener assembly comprises a retainer adapted to fit at least partly within the track slot, a rotatable handle operating on the retainer, the rotatable handle being rotatable between at least an engagement position and a release position, and a pressure applicator positioned above the track and below the rotatable handle, the pressure applicator applying a pressure on a top surface of the track in response to the position of the rotatable handle.

According to another embodiment of the present invention, a method of securing an object to a track including a track slot is provided, comprising rotating a rotatable handle thereby vertically displacing the rotatable handle relative to a pressure applicator positioned above the track, and vertically displacing a retainer positioned within the track slot between an engagement position and a release position relative to the vertical displacement of the pressure applicator.

According to another embodiment of the present invention, a slidably retainable fastener assembly for securing loads to a track is provided, comprising a retainer adapted to fit at least partly within a track slot of the track, and a cam member operating on the retainer, the cam member being positionable in at least a first position and a second position. When the cam member is positioned in the first position, the cam member causes the retainer to disengage the track slot thereby allowing the fastener to be movable within the track slot, and when the cam member is positioned in the second position, the cam member causes the retainer to engage the track slot thereby causing the fastener to remain stationary within the track slot.

BRIEF DESCRIPTION OF THE DRAWINGS

The foregoing advantages and features of the invention will become apparent upon reference to the following detailed description and the accompanying drawings, of which.

DETAILED DESCRIPTION OF THE PREFERRED EMBODIMENTS

Reference will now be made in detail to presently preferred embodiments of the invention. Wherever possible, the same reference numbers will be used throughout the drawings to refer to the same or like parts.

The following description of the present invention will describe implementations of the present invention in reference to a track slot used in a truck bed. One such implementation is described in copending U.S. patent application Ser. No. 09/874,979 filed Jun. 7, 2001, by Michael D. Anderson et al., which is incorporated by reference herein in its entirety. Additional improvements and variations are described in the aforementioned corresponding related applications. Other implementations are also contemplated, as would be readily apparent to one of ordinary skill in the art after reading this disclosure.

It should be appreciated that the term "track slot" as used in the present application refers to the entire internal volume of the track. Hence, "track slot" includes the space substantially between two upper inwardly protruding portions at the top of the track, and the volume underneath the protruding portions to a bottom surface of the track. It should also be appreciated that the term "load" as used in the present application refers to a force applied to a fastener assembly by an object secured thereto. This "load" may include, for example, a horizontal force acting substantially along a plane of a vehicle body, a vertical force acting upwards and away from the aforementioned plane of the vehicle body, or a combination of the two.

Figure 1:
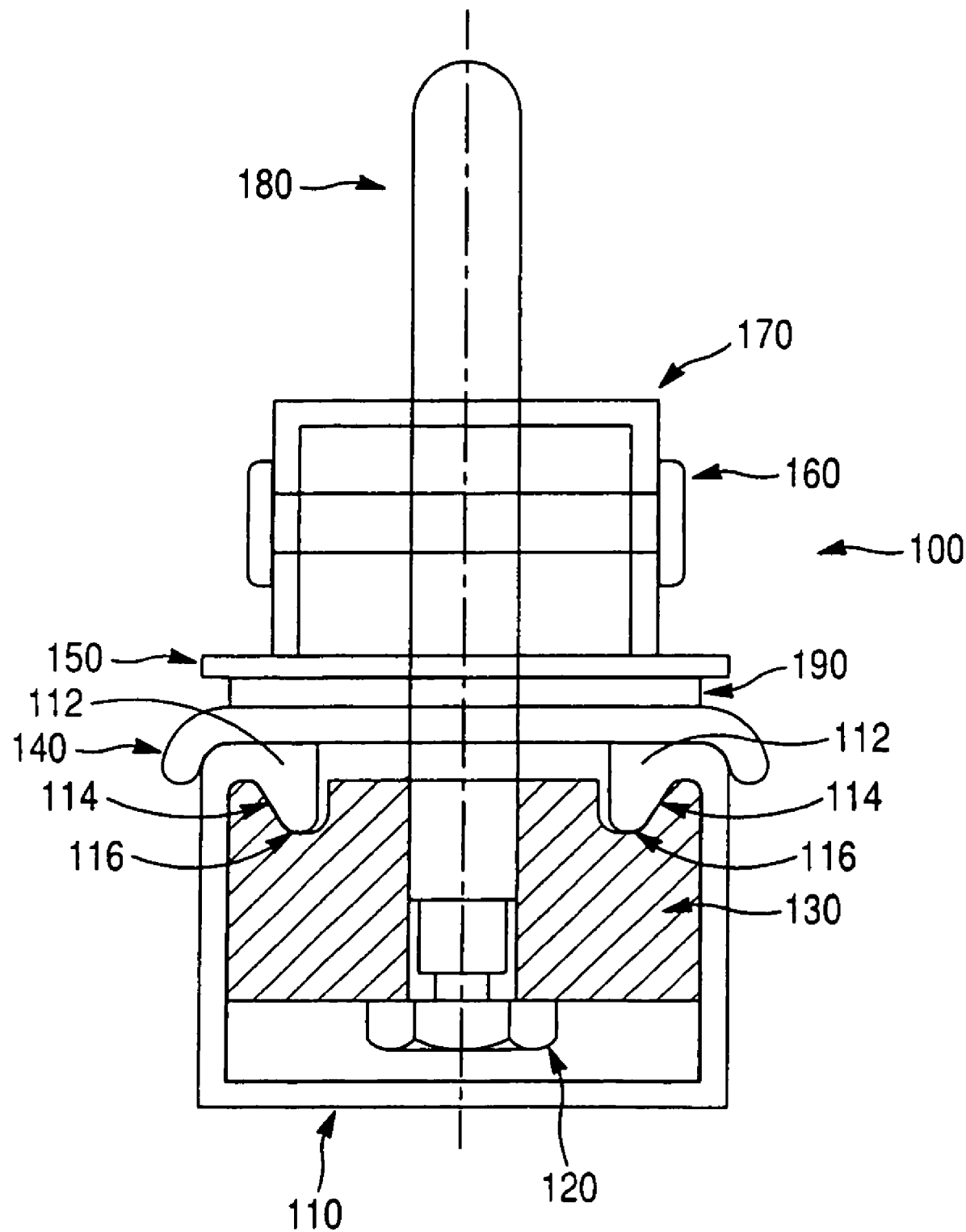
FIG. 1 is a sectional view of a fastener assembly according to an embodiment of the present invention.
Figure 2:
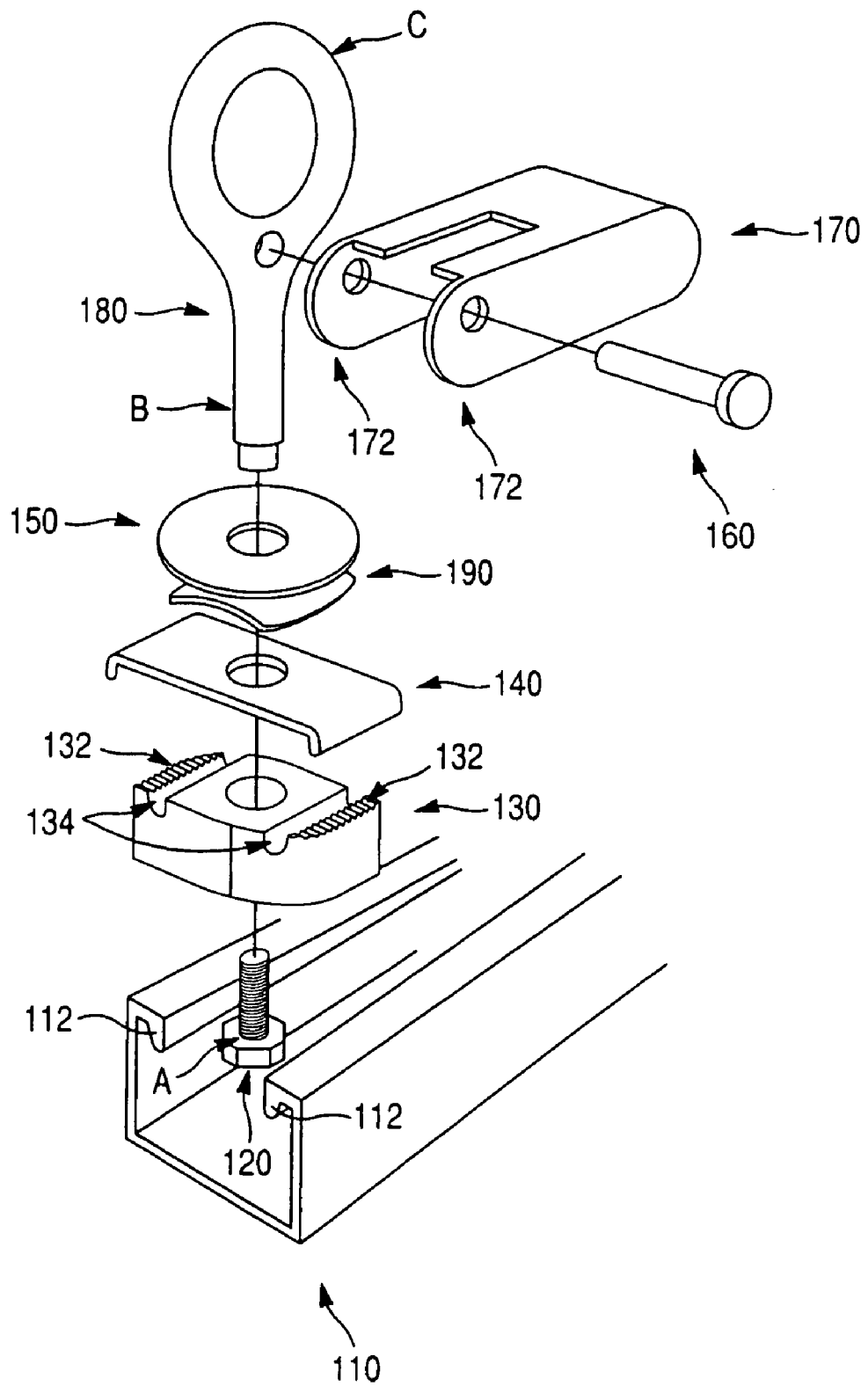
FIG. 2 is an exploded view of the fastener assembly of FIG. 1.

A fastener assembly 100 retainable within a track slot according to an embodiment of the present invention is shown in the sectional view of FIG. 1, and the exploded view of FIG. 2. As shown, track 110 is substantially C shaped, with two inward projecting extensions 112. The two extensions 112 include abscesses 114 which are preferably smooth, but can be serrated if desired.

A pressure plate 140 (e.g., a pressure applicator) is shown positioned above the track 110, applying a substantially uniform pressure on a top surface of the track 110. Preferably, pressure plate 140 is flanged at opposite lateral ends, such that the flanged portions properly seat the pressure plate 140 on the top surface of the track 110.

A belleville washer 190 (i.e., one type of spring) positioned adjacent to pressure plate 140 is shown in a decompressed configuration in FIG. 2, and a compressed configuration in FIG. 1. A washer 150 is shown positioned between belleville washer 190 and a handle 170. Preferably, washer 150 has a diameter substantially equal to the compressed diameter of belleville washer 190. Handle 170 is coupled with a retainer 130 at end A (represented by separable bolt 120) of shaft B; the shaft B including at one end C at least one of an eyelet 180, a hook, a ring, a carabiner, a clamp, a clasp, or other suitable tie down or attachment connection. As shown, the shaft B may comprise a bolt 120 or other suitable coupler.

Positioned within the track slot is retainer 130. Preferably, retainer 130 has a width substantially equal to the inner width of the track slot such that retainer 130 substantially conforms to an inner width of the track slot. Also, retainer 130 is preferably configured so as to have a size and shape that allows for top down loading (i.e., in a direction substantially perpendicular to the top surface of track 110) into the track 110. More specifically, retainer 130 is configured to have angled/cut corners on diagonally opposite edges such that the retainer 130 can be rotated about 90° once it is placed within the track 110.

As shown best in FIG. 2, retainer 130 preferably includes channel portions 134 for engaging ribs 116 of abscesses 114. Furthermore, retainer 130 also may include serrated edges 132 outside of the channel portions 134 for engaging abscesses 114 of the track 110. Preferably, the retainer 130 is made of aluminum or steel, preferably cold headed or forged. Such a material is selected such that the retainer 130 has a high strength and durability, and is resistant to corrosion. The operation of the fitting assembly will now be described in detail below.

As shown in FIG. 1, the fitting assembly is configured in an engagement position, where serrated edges 132 of retainer 130 engage abscesses 114 of track 110. A slight gap is present between the bottom of bolt 120 and the bottom surface of track 110. Serrated edges 132 help to fix the fitting assembly securely in place along the track 110 when engaging abscesses 114 of track 110.

To release the fitting assembly, the handle 170 is pivoted about a pin 160 to a disengagement position, preferably about 180° with respect to the engagement position shown in FIG. 1. During pivoting, an integrated cam surface 172 of handle 170 releases the force on washer 150 which decompresses belleville washer 190 from pressure plate 140, thereby vertically displacing retainer 130. Serrated edges 132 of retainer 130 then disengage abscesses 114 of track 110, allowing the fitting assembly to slide freely along the track 110.

It should be appreciated that the holes in handle 170 (see FIG. 2) are preferably off center (i.e., closer to the top), such that when the handle 170 is pressed down, the retainer 130 is lifted and tightened into the engagement position, and when the handle 170 is lifted, the retainer 130 loosens. Hence, this configuration causes the above described engagement and disengagement operation.

The above described fastener assembly is particularly advantageous over conventional approaches, as it is relatively easy to use and inexpensive to manufacture. Belleville washer 190 and the shape of cam surface 172 also provide for automatic locking of the handle 170 in a given position, which improves the ease of use. Moreover, the above described fastener assembly requires no tools to relocate it along the track, and can be relocated to any position along the track (i.e., not just at predetermined fastening locations). Also, the invention eliminates any uncertainty as to whether the fastener is tightened too much or too little. Thus, the present invention provides substantial improvements over conventional fasteners.

Figure 3:
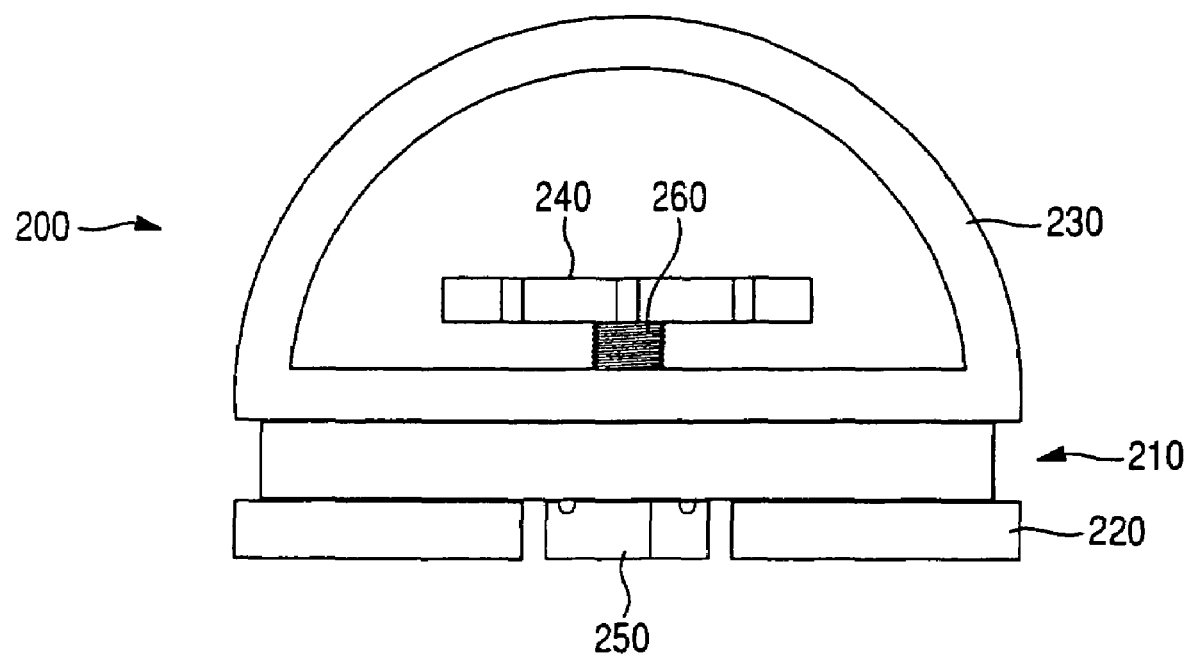
FIG. 3 is a sectional view of a fastener assembly according to another embodiment of the present invention.

A fastener assembly retainable within a track slot according to another embodiment of the present invention is shown in FIG. 3, with parts thereof depicted in greater detail in FIGS. 4 and 5A-5G. The fastener assembly 200 according to this second embodiment comprises a cleat 210 including a base portion 220 adapted to fit within the track slot 110 (preferably in such a way as to provide for top-down loading). The cleat 210 is locked to the track slot 110 (i.e., in an engagement position) via ratchet lock 240. It should be appreciated that the cleat 210 refers to any slidable member adapted to fit within the track slot 110. It should also be appreciated that the term "ratchet" refers to a device that is tightened as it rotates until a predetermined amount of torque is attained, and then spins freely, re-releases, locks, or indicates in some manner that the required fastening torque has been attained.

Hence, the ratchet lock 240 is preferably configured to limit the maximum fastening torque applied to the ratchet lock 240 to prevent damage to the track 110 and/or the fastener assembly 200 from over tightening. Furthermore, the ratchet lock 240 is also configured to set a minimum fastening torque applied to the ratchet lock 240 to prevent undertightening of the fastener assembly 200. In operation, the ratchet lock will "click" when an appropriate torque is attained, similar to a gas cap being screwed on after refueling. As will be set forth in greater detail below, one such ratchet lock 240 is shown in the views of FIGS. 5A-5G.

Figure 4:
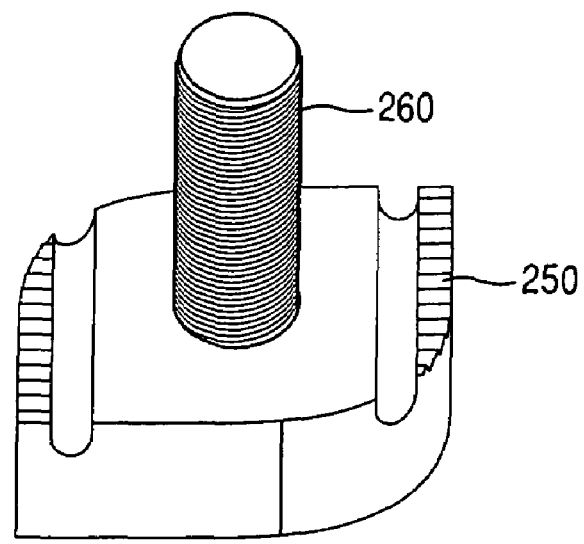
FIG. 4 is a perspective view of a retainer with a threaded shaft according to an embodiment of the present invention.

The ratchet lock 240 preferably comprises a rotatable base portion 242 (e.g., a header) coupled to a retainer 250 via a threaded shaft 260 (see FIG. 4). The rotatable base portion 242 is configured to thread onto the shaft 260 to raise/lower the retainer 250. According to one aspect of the present invention, the rotatable base portion 242 includes a hex nut (not shown) placed in the center portion of the rotatable base portion 242. Alternatively, the rotatable base portion 242 may be drilled and threaded to directly thread onto the shaft 260.

As shown in FIGS. 5A-5G, the base portion 242 can be formed with one or more torque cantilevers 244, preferably a plurality of torque cantilevers 244 extending all the way around a vertical surface of the rotatable base portion 242. As shown best in FIG. 5E, the torque cantilevers 244 engage corresponding notched portions 233 formed on an inner surface of rotatable top 243. The torque cantilevers 244 "spin" when a fastening torque greater than a predetermined maximum is applied to the ratchet lock 240, or when the rotatable top 243 is rotated in a counterclockwise direction. When the rotatable top 243 is rotated in a clockwise direction, the torque cantilevers 244 ratchet engage the notched portions 233 formed on the inner surface of rotatable top 243, thereby rotating the rotatable base portion 242 on the shaft 260, thereby vertically displacing the retainer 250 within the track slot 110. The vertical displacement of retainer 250 locks the cleat 210 to the track slot 110 (i.e., an engagement position), or releases the cleat 210 from the track slot 110 (i.e., a disengagement position).

Figure 5A:
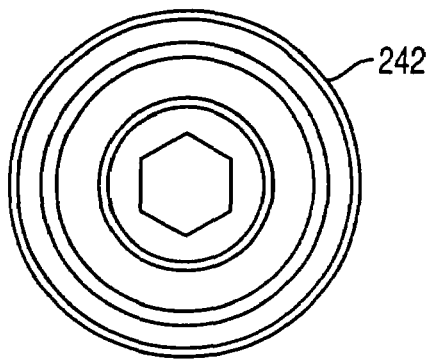
FIGS. 5A-5G are views of a ratchet lock according to an embodiment of the present invention.
Figure 5B:
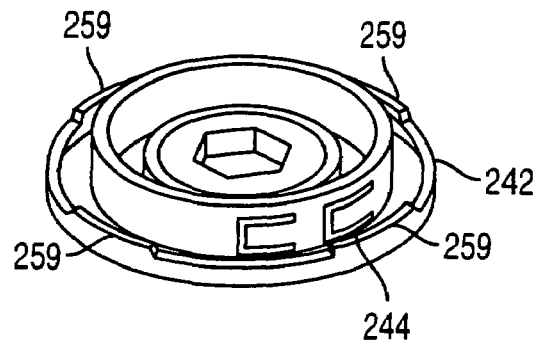
Figure 5C:
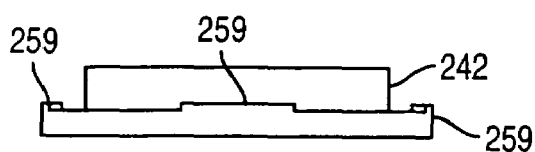
Figure 5D:
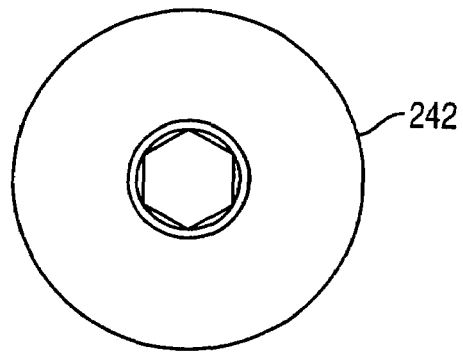
Figure 5G:
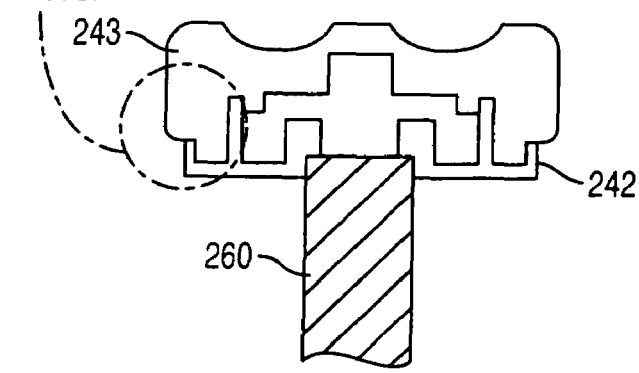
Figure 5E:
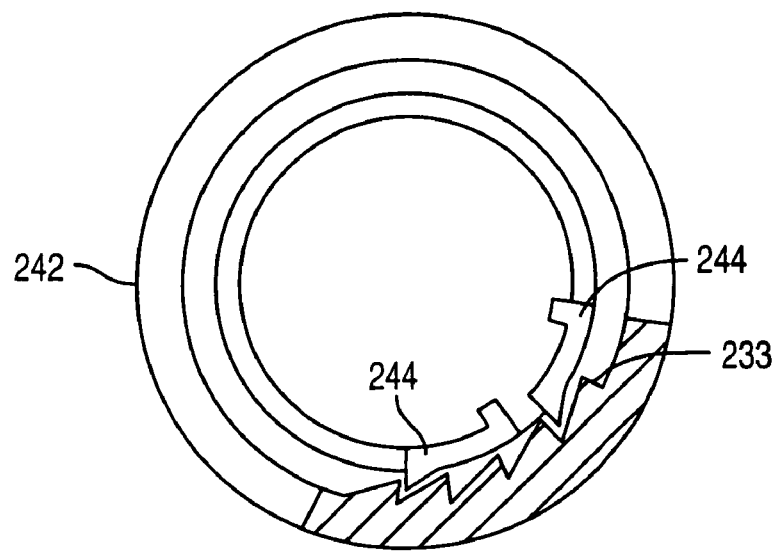
Figure 5F:
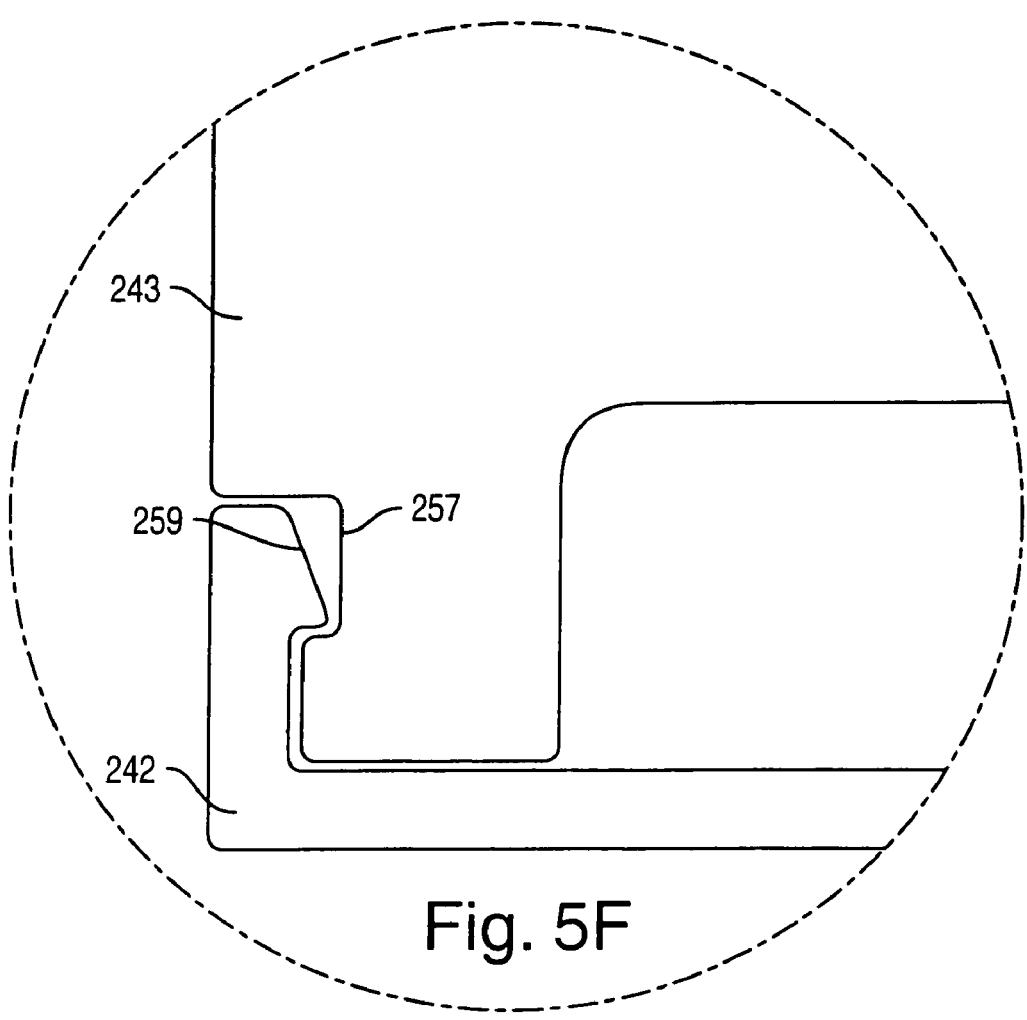
Figure 6:
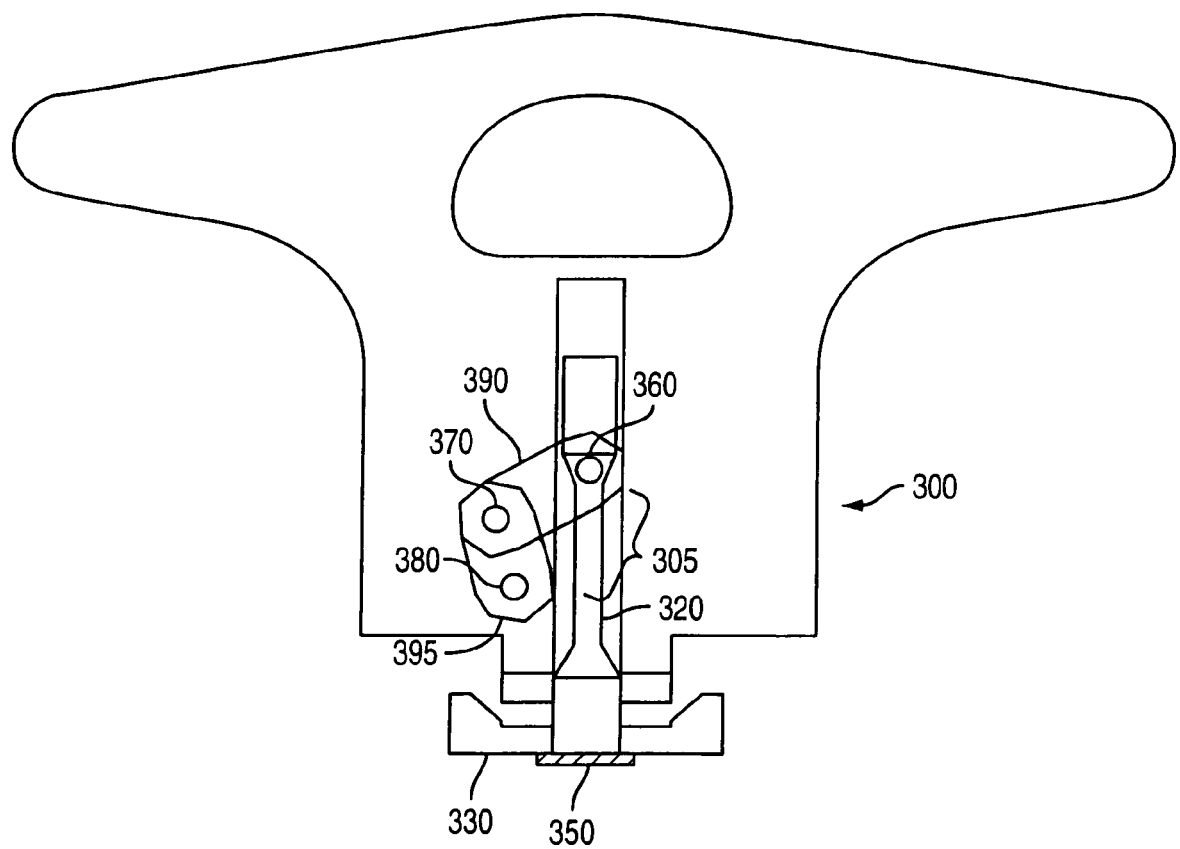
FIG. 6 is a sectional view of another fastener assembly according to an embodiment of the present invention.

As shown best in FIG. 5F (an enlargement of the bottom left corner of FIG. 5G), the rotatable base portion 242 is preferably rotatably fixed relative to the rotatable top 243 by a protrusion 259 extending within the groove 257 formed along an exterior surface of the rotatable top 243. As shown in FIG. 5B, preferably four protrusions 259 are formed, though the number and spacing along rotatable base portion 242 may vary. Other attachment schemes are also within the scope of this invention, as would be readily apparent to one of ordinary skill in the art after reading this disclosure.

As shown in FIG. 3, the fastener assembly 200 also includes a tie down 230 for securing loads to the fastener assembly 200. Preferably, the tie down 230 is substantially arc shaped as shown. However, it should be appreciated that the tie down 230 may be configured as an eyelet, a hook, a ring, a carabiner, a clamp, a clasp, or other suitable tie down or attachment connection. In the substantially arc shaped configuration shown, the rotatable base portion 242 of ratchet lock 240 is positioned between the arc shaped tie down 230 and the base portion 220 of cleat 210.

In addition to the aforementioned benefits of previously described embodiment(s) of the present invention, the fastener assembly 200 of the present invention provides for a cosmetically appealing fastener by partially hiding the ratchet lock 240 via the arc shaped tie down 230. Furthermore, the "spin" torque cantilevers 244 help prevent over tightening of the ratchet lock 240 and indicate to the user that the fastener assembly 200 is fully tightened (e.g., by generating audible clicking sounds when the fastener assembly 200 is sufficiently tight), thereby reducing any chance of damaging the fastener assembly 200 or track 110 due to over tightening. Hence, the fastener assembly 200 provides for substantial improvements over existing fasteners.

A fastener assembly retainable within a track slot according to another embodiment of the present invention is shown in FIGS. 6-12. The fastener assembly 300 according to this third embodiment comprises a retainer 330 adapted to fit within the track 110. Similar to the first embodiment, the retainer 330 is vertically displaceable within the track 110, such that it engages abscesses of the track 110 to secure the fastener assembly 300 to the track 110. Retainer 330 is preferably configured so as to have a size and shape that allows for top down loading (i.e., in a direction substantially perpendicular to the top surface of track 110) into the track slot.

Figure 7:
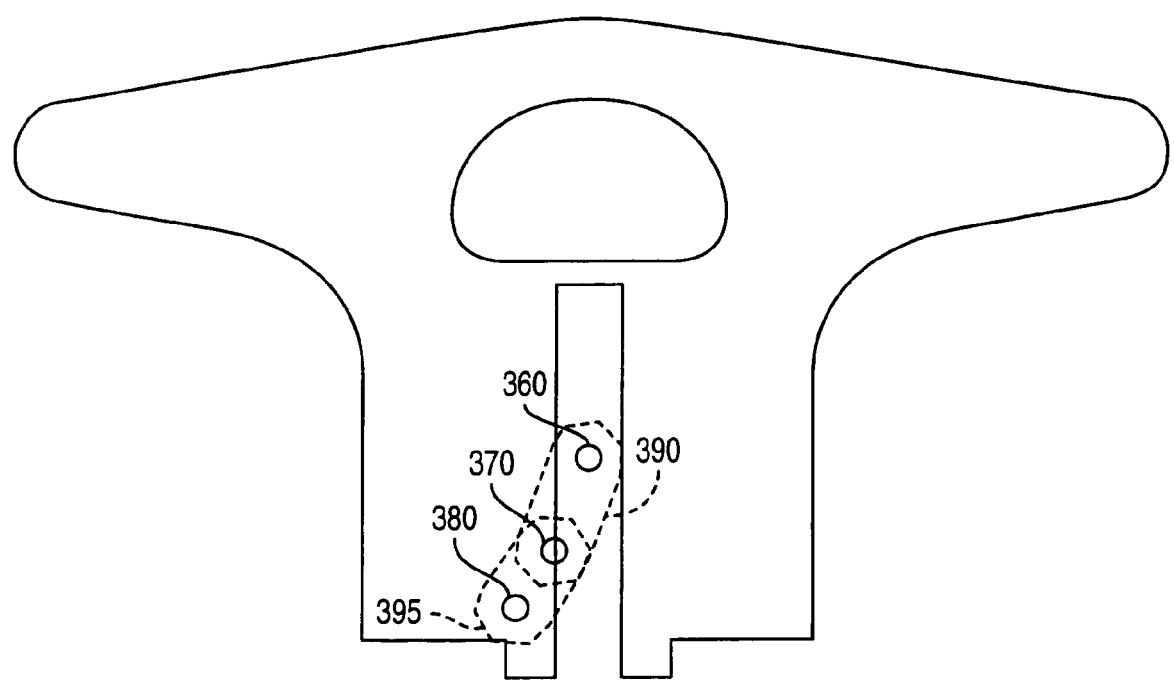
FIG. 7 is a sectional view of the fastener assembly of FIG. 6 in a locked position according to an embodiment of the present invention.
Figure 8:
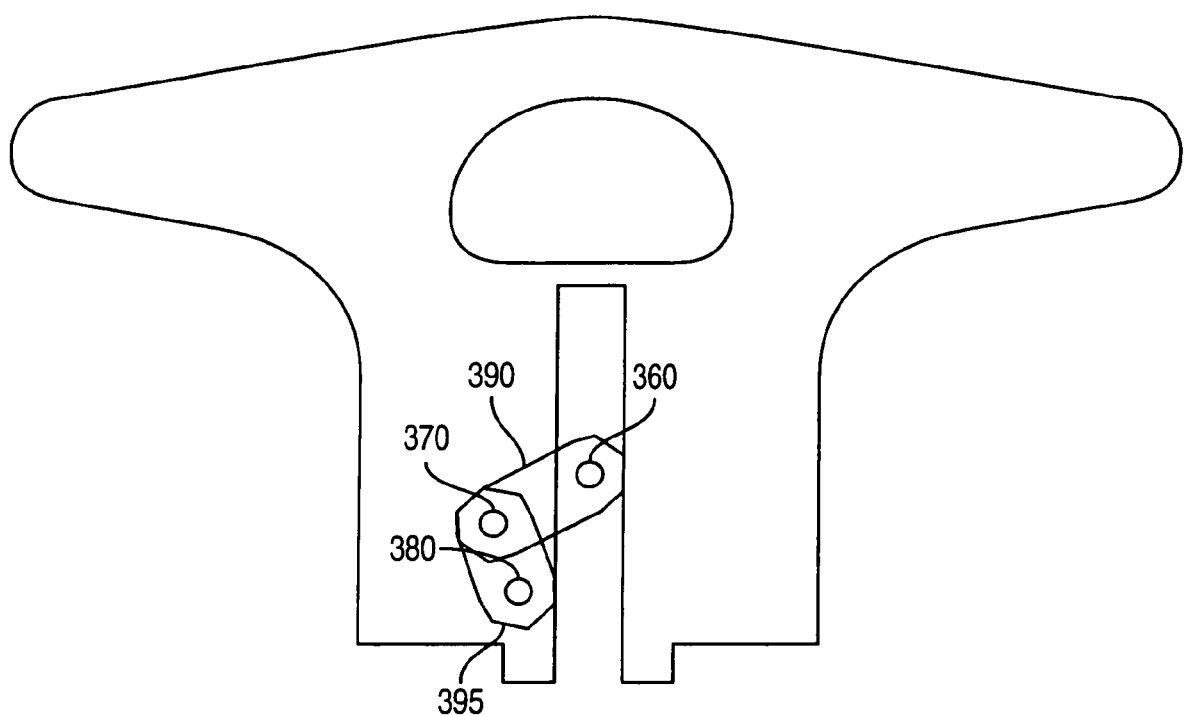
FIG. 8 is a sectional view of the fastener assembly of FIG. 6 in a released position according to an embodiment of the present invention.
Figure 10:
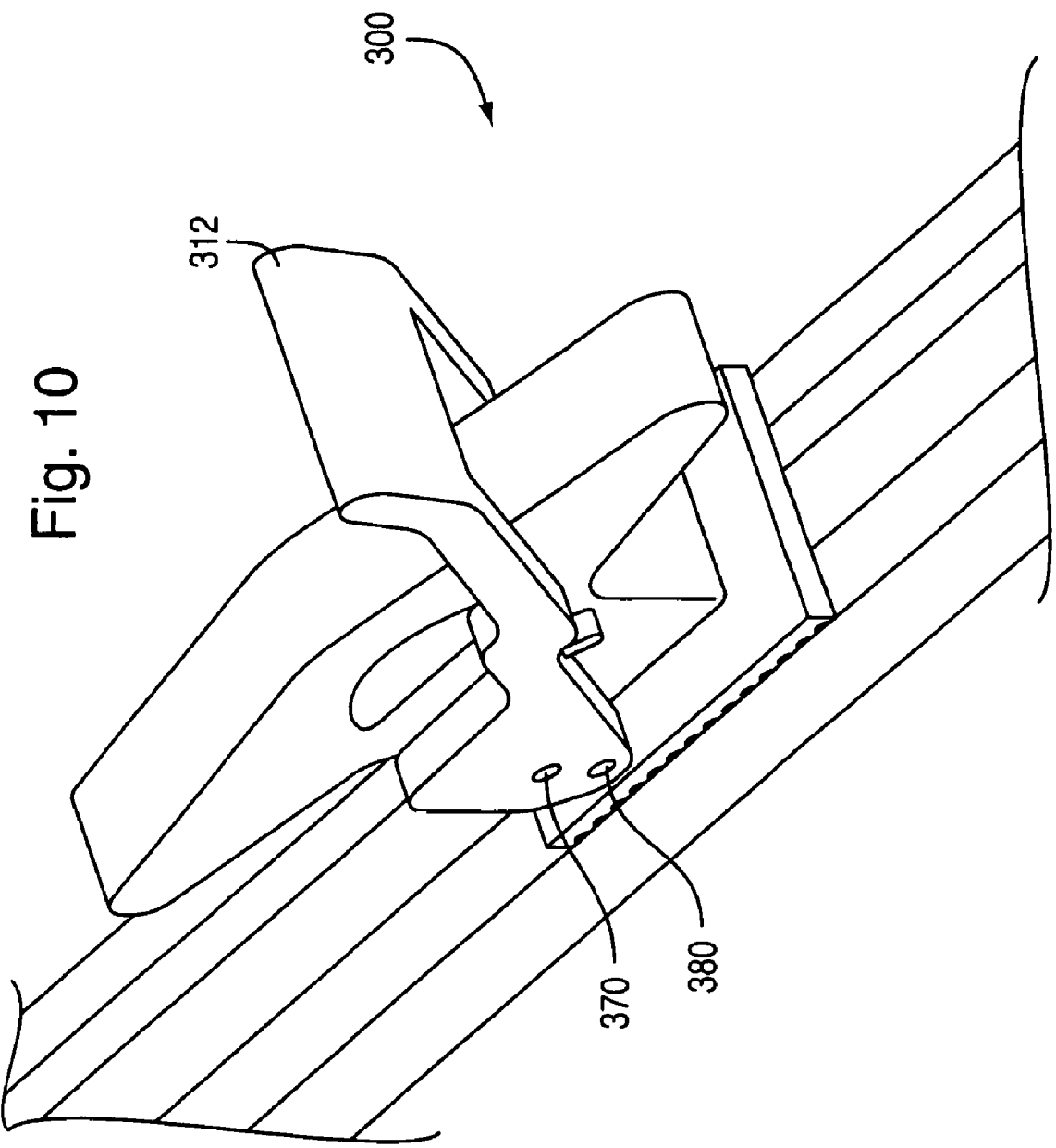
FIG. 10 is a perspective view of the fastener assembly of FIG. 6 in a released position according to an embodiment of the present invention.
Figure 11:
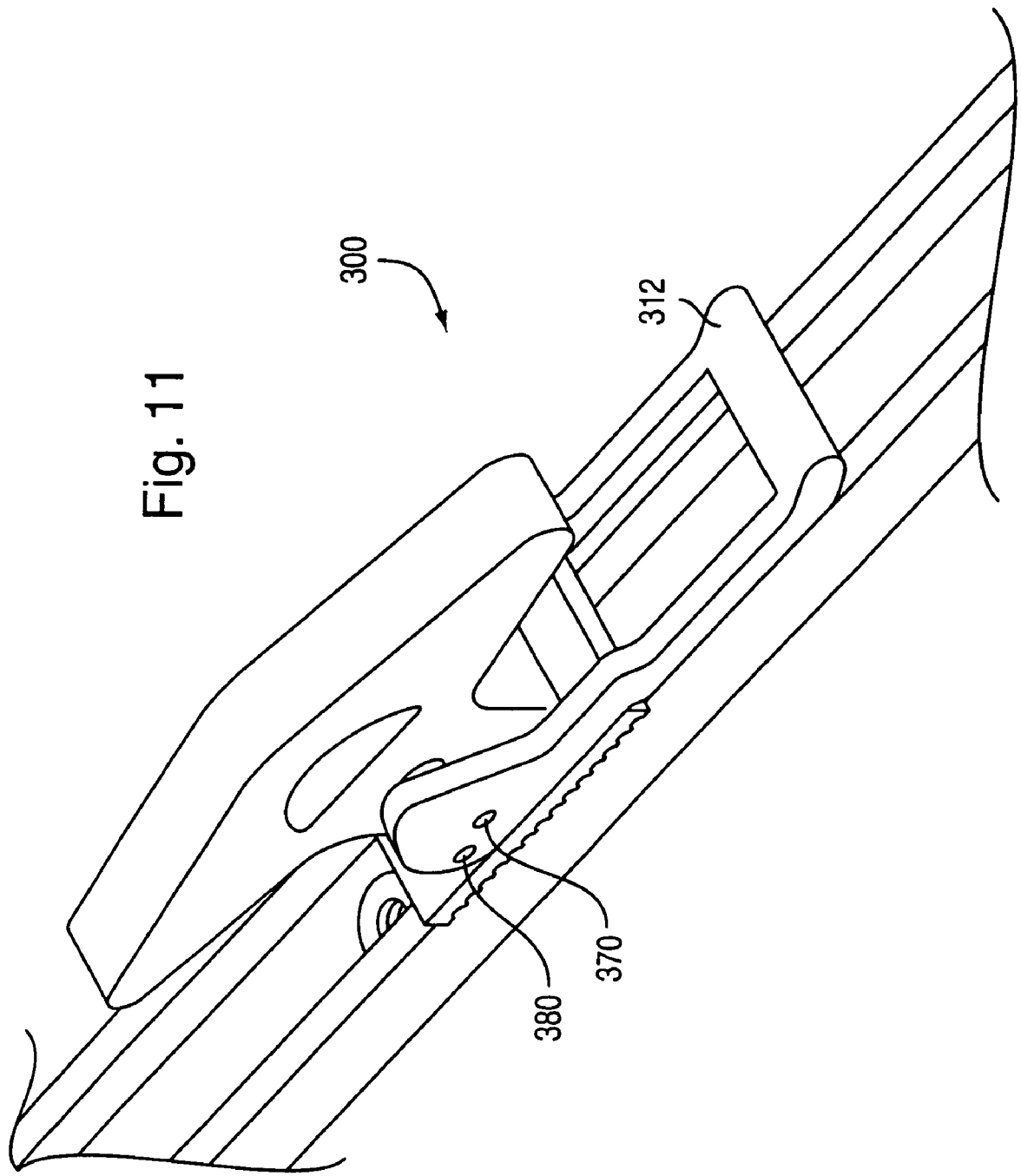
FIG. 11 is a perspective view of the fastener assembly of FIG. 6 in an engagement position according to an embodiment of the present invention.

According to this third embodiment, the fastener assembly 300 includes a pin lock 305 operating on the retainer 330, the pin lock 305 being operable in a released/disengagement position (FIGS. 6, 8, 10, 12), and in a locked/engagement position (FIGS. 7, 11). The pin lock 305 includes a first pin 360 coupled to the retainer 330 via shaft 320 and linked to a second pin 370 via a first locking arm 390. A welded base portion 350 (e.g., a lockplate) or the like may be used to couple the shaft 320 to the retainer 330 depending on the particular implementation. The pin lock 305 further includes a third pin 380 coupled to the handle operating on the pin lock 305 and linked to the second pin 370 via a second locking arm 395. Second locking arm 395 is preferably an integral part of the handle 312 (FIGS. 10, 11) but is described as a separate arm for illustration purposes.

Figure 9:
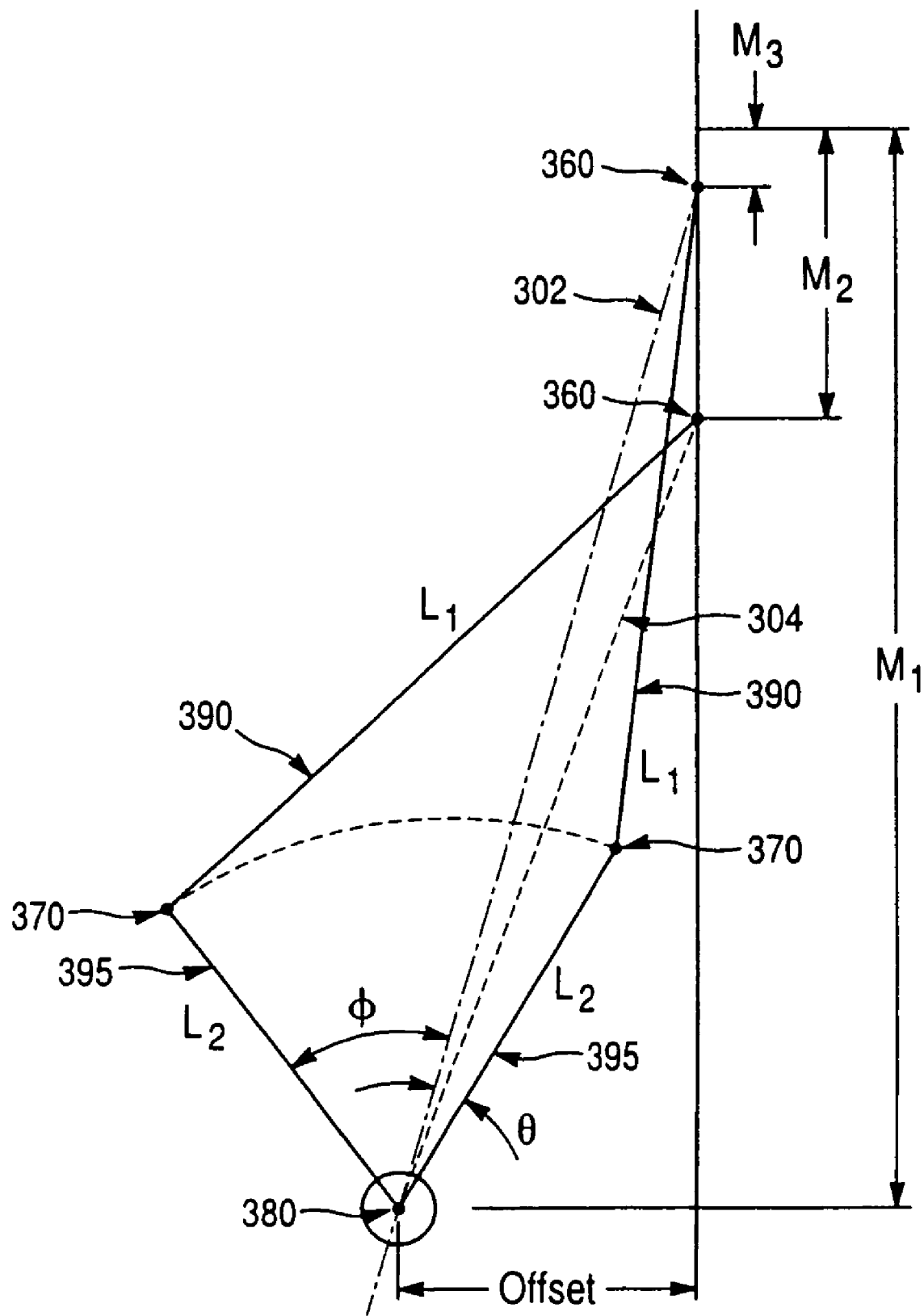
FIG. 9 is a drawing of a pin lock configuration according to an embodiment of the present invention.

The operation of the pin lock 305 will now be described in reference to FIG. 9. For purposes of explanation, both the "released" position (i.e., Φ about 40°) and the "locked" position (i.e., θ about 10°) are depicted in FIG. 9. Preferably, first locking arm 390 has a length $L_1$ of about 14 mm, and second locking arm has a length $L_2$ of about 9 mm. It should be appreciated that $L_1+L_2 \simeq M_1$, the maximum length of the locking arms 390 and 395 in combination.

Assuming the third pin 380 remains substantially in the same location in the released position and in the locked position, the first pin 360 is located at a distance $M_3$ from one end of the maximum length $M_1$ when in the locked position. The first pin 360 is vertically displaceable within the fastener assembly 300 to displace the retainer 330 between the locked position and the released position Similarly, in the released position, the first pin 360 is located at a distance $M_2$ from one end of the maximum length $M_1$. In operation, the first pin 360 and the third pin 380 are aligned along a locking axis 302 substantially bisecting the first pin 360 and the third pin 380 when the pin lock 305 is positioned in the locked position. Furthermore, the first pin 360 and the third pin 380 are aligned along a released axis 304 substantially bisecting the first pin 360 and the third pin 380 when the pin lock 305 is positioned in the released position.

This configuration provides for vertical displacement of the retainer 330 coupled to the vertically displaced first pin 360, and a secure "lock" of the retainer 330 to the track 110 when the pin lock 305 is in the locked position. It should be appreciated that Φ must be large enough to provide sufficient travel to take up the entire release clearance. This provides for a simple locking mechanism to lock the fastener assembly 300 to the track 110, and also provides for an easy release to allow the fastener assembly 300 to be slid along track 110 to another position. Hence, in addition to various advantages of the aforementioned embodiments of the present invention, this configuration also provides for many improvements over conventional fasteners.

Figure 12:
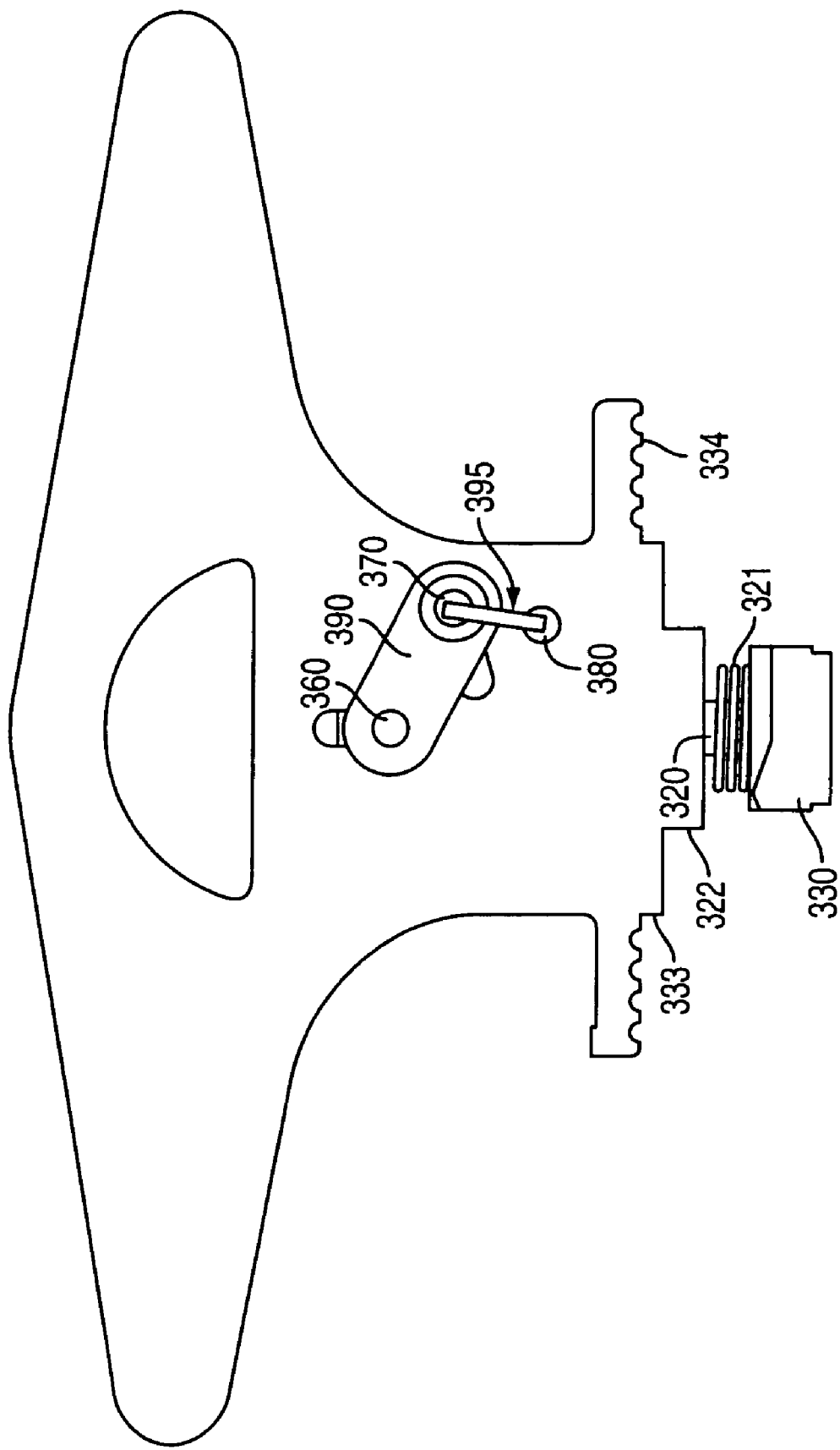
FIG. 12 is a perspective view of a variation on the fastener assembly of FIG. 6 in a released position according to an embodiment of the present invention.

For loading purposes, the fastener assembly 300 may be provided with spring 321, first loading projection 322, second loading projection 333, and running surface 334 as shown best in FIG. 12. To load the fastener assembly 300, the fastener assembly 300 is placed on top of a track 110 rotated 90° about a vertical axis therefrom with respect to the operational position shown in FIGS. 10 and 11. The second loading projection 333 is configured to have a length greater than a width of the slot of the track 110, such that the second loading projection 333 rests on a top surface of the track 110 in a loading position.

The first loading projection 322 operates with the spring 321 to force a gap between a top surface of the retainer 330 and a bottom surface of the second loading projection 333. This gap is designed to be large enough such that the retainer 330 can be rotated 90° within the track 110 once the fastener assembly 300 is placed in the loading position. The entire fastener assembly 300 is then rotated 90° to the operation position shown in FIGS. 10 and 11. The second loading projection 333 is thus configured to have a width smaller than a width of the slot of the track 110, such that the second loading projection 333 rests within the track 110 in the operational position, and the running surface 334 is configured to rest on a top surface of the track 110 in the operational position as shown in FIGS. 10 and 11. Once in the operational position, the fastener assembly 300 can be used as indicated above.

Figure 13:
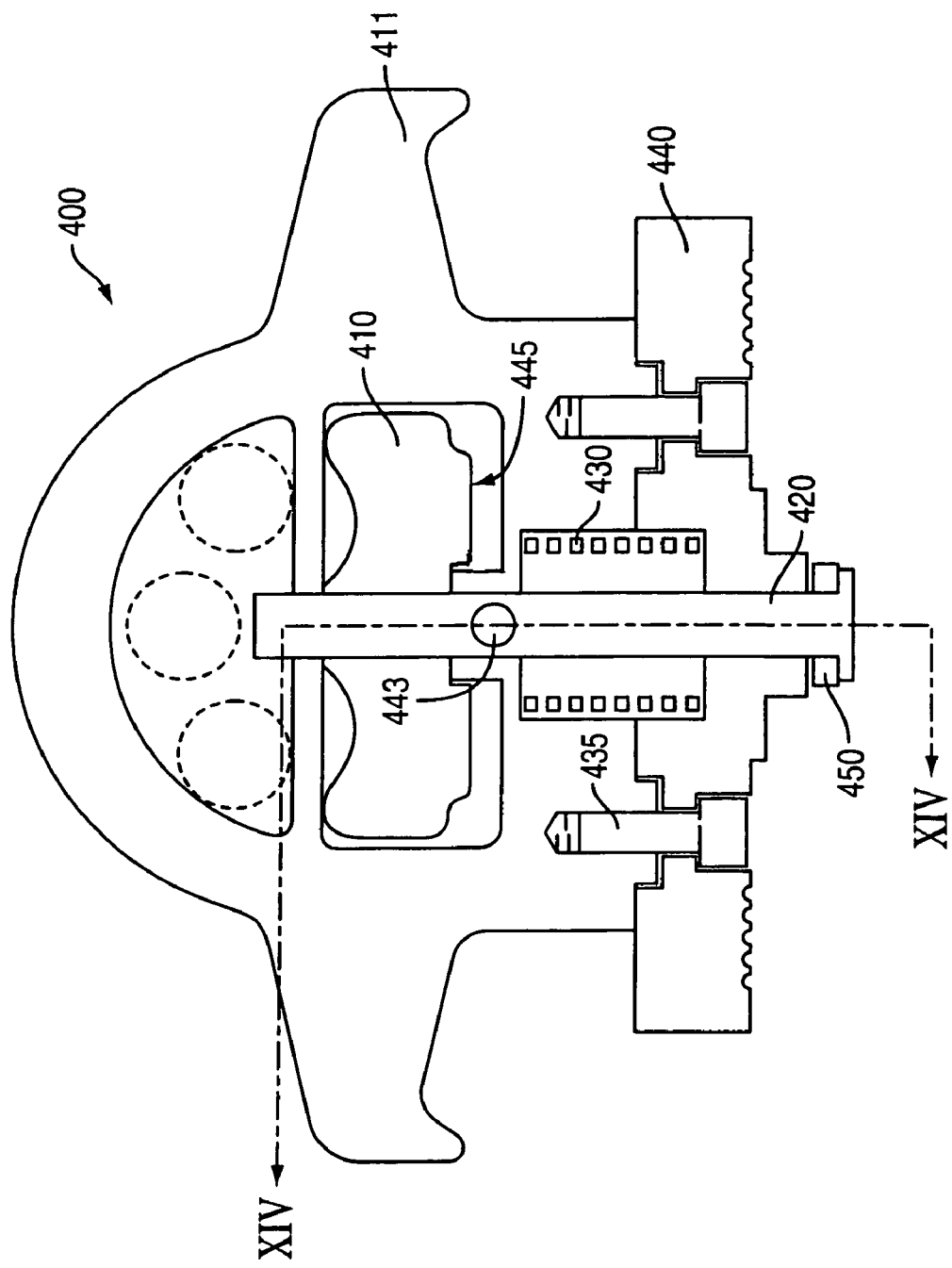
FIG. 13 is a sectional view of a fastener assembly with ramped or angled portions according to an embodiment of the present invention.
Figure 14:
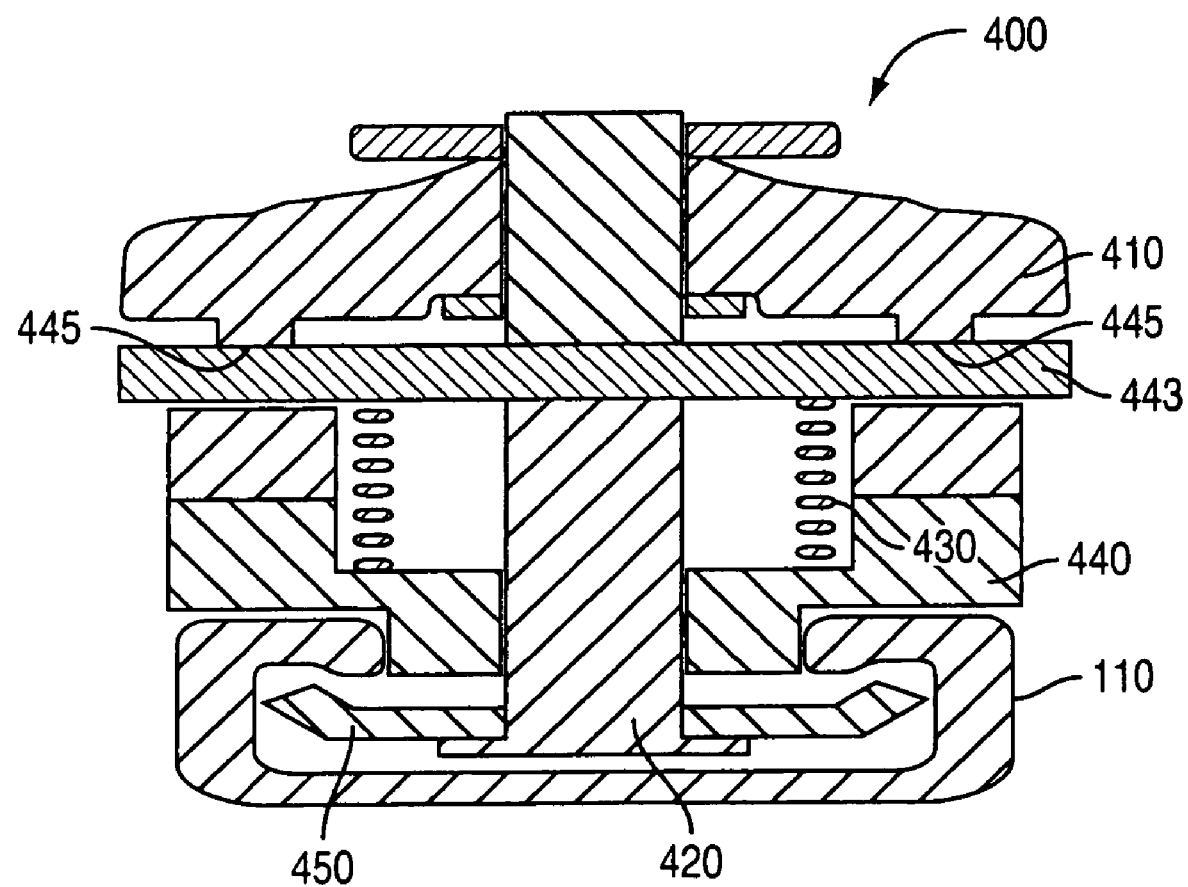
FIG. 14 is a partial sectional view of the fastener assembly of FIG. 13 along plane XIV-XIV according to an embodiment of the present invention.

A fastener assembly retainable within a track slot according to another embodiment of the present invention is shown in FIGS. 13 and 14, with a portion cut along plane XIV-XIV shown in greater detail in FIG. 14. The fastener assembly 400 according to this embodiment includes a rotatable handle 410 (e.g., a thumb-wheel) within an outer tie down 411 for securing loads to the fastener assembly 400. The rotatable handle 410 operates retainer 450 via shaft 420. A spring 430 is provided in a space between the rotatable handle 410 and pressure plate 440, such that the spring 430 applies a vertical force on the pin 443 with respect to the pressure plate 440.

To operate the fastener assembly 400, the rotatable handle 410 includes an angled running surface 445 interfacing pin 443. As the rotatable handle 410 is rotated between a locked position and a released position, the angled running surface 445 vertically displaces the pin 443 coupled to the retainer 450 with respect to the pressure plate 440. The rotatable handle 410 cannot be vertically displaced beyond a maximum amount due to intersecting the outer tie down 411, thus the rotatable handle 410 vertically displaces the pin 443 via the angled surface 445, which similarly displaces retainer 450 via shaft 420, thereby locking or unlocking the fastener assembly 400 from the track slot 110.

The interface between the angled running surface 445 and the pin 443 can be designed to prevent overtightening of the fastener assembly 400 and to default to a tightened condition when "partial" tightening occurs. By way of example, the angled running surface may include a notch (not shown) for receiving the pin 443 at a loosened state near a "top" of the angled running surface 445. If an operator only partially loosens the fastener assembly 400, thereby not reaching the notch, the spring 430 forces the pin 443 to slide down the angled running surface 445 back into a tightened/engaged position. To prevent overtightening, the spring 430 is configured to apply the maximum retention force on the retainer 450 when the pin 443 is at the "bottom" of the angled running surface 445. Hence, both overtightening prevention and default engagement can be achieved.

It should be appreciated that various aspects of the aforementioned embodiments may be combined and/or modified amongst the various embodiments of the present invention. Thus, for example, the second and/or third embodiments may be provided with channel portions 134 for engaging ribs 116 of abscesses 114, and/or serrated edges 132 outside of the channel portions 134 for engaging abscesses 114 of the track 110. Furthermore, the second and/or third embodiments may be configured to allow for top down loading into the track 110, to make it easier to replace or add fasteners. Other variations are also possible, as would be readily apparent to one of ordinary skill in the art after reading this disclosure.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto, and their equivalents.

What is clamed is:

1. A fastener assembly for securing a load to a track, the fastener assembly being retainable at least partly within a track slot of the track, the fastener assembly comprising:

an arc-shaped tie down;

a retainer adapted to fit at least partly within the track slot;

a rotatable handle positioned at least partially within the arc-shaped tie down and operating on the retainer via a shaft, the rotatable handle being rotatable between at least an engagement position and a release position;

a pressure applicator positionable between the track and the rotatable handle, the pressure applicator having a bottom surface configured to apply a pressure on a top surface of the track in response to positioning of the rotatable handle, the pressure applicator having opposing first and second ends defining a longitudinal direction of the pressure applicator; and a base portion arranged below the bottom surface of the pressure applicator, wherein the base portion has a first portion extending from the first end of the pressure applicator toward a longitudinal center of the pressure applicator and a second portion extending from the second end of the pressure applicator toward the longitudinal center of the pressure applicator.

2. A fastener assembly as set forth in claim 1, wherein the retainer is positionable at least partly above a bottom surface of the base portion.

3. A fastener assembly as set forth in claim 1, wherein the retainer is positionable in a gap formed between the first portion and the second portion.

4. A fastener assembly as set forth in claim 1, wherein the shaft includes a threaded portion that is operatively coupled to the rotatable handle.

5. A fastener assembly as set forth in claim 1, wherein the shaft and the retainer are unitarily formed.

6. A fastener assembly as set forth in claim 1, further including a pair of arms extending in opposite directions from the arc-shaped tie down to secure a load to the fastener assembly.

7. A fastener assembly as set forth in claim 1, wherein the shaft is positioned at the longitudinal center of the pressure applicator.

8. A fastener assembly as set forth in claim 1, further comprising a boss portion projecting from the bottom surface of the pressure applicator at the longitudinal center, the shaft passing through the boss portion.

9. A fastener assembly as set forth in claim 1, wherein the base portion is configured to permit top-down loading of the fastener assembly into the track.

* * * * *